UNITED STATES PATENT OFFICE.

MARY C. ROSS, OF NEW YORK, N. Y.

IMPROVED COMPOUND FOR LINIMENT.

Specification forming part of Letters Patent No. 40,642, dated November 17, 1863.

*To all whom it may concern:*

Be it known that I, MARY C. ROSS, of the city and State of New York, have invented or compounded and applied to use a certain new and useful composition forming a liniment for rheumatism, sprains, swellings, and other ailments of the flesh requiring an external application for their removal; and I do hereby declare the following to be a full, clear, and exact description of the ingredients composing the said liniment and the mode of compounding the same.

I make use of the following ingredients in the proportions named, or as nearly as they can be conveniently measured and weighed: To half a pint of alcohol (½ pt.) I add three ounces of champhor (3 ozs.) and two ounces of spirits of hartshorn (2 ozs.;) and to half a pint of spirits of turpentine (½ pt.) I add four ounces of oil of tar (4 ozs.,) and I mix these ingredients together with the addition of two ounces of Cayenne pepper ground (2 ozs.) These ingredients will be found to mix together by a slight shaking, and when applied to the skin as a liniment become an efficient remedial agent in the cure of rheumatism, sprains, swellings, and similar ailments.

What I claim, and desire to secure to by Letters Patent, is—

The liniment composed of the ingredients and compounded, as specified, for the purposes set forth, the same being a new article of manufacture.

In witness whereof I have hereunto set my signature this 28th day of September, A. D. 1863.

MARY C. ROSS.

Witnesses:
WM. G. ROSS,
WM. HACH.